Figure 1:
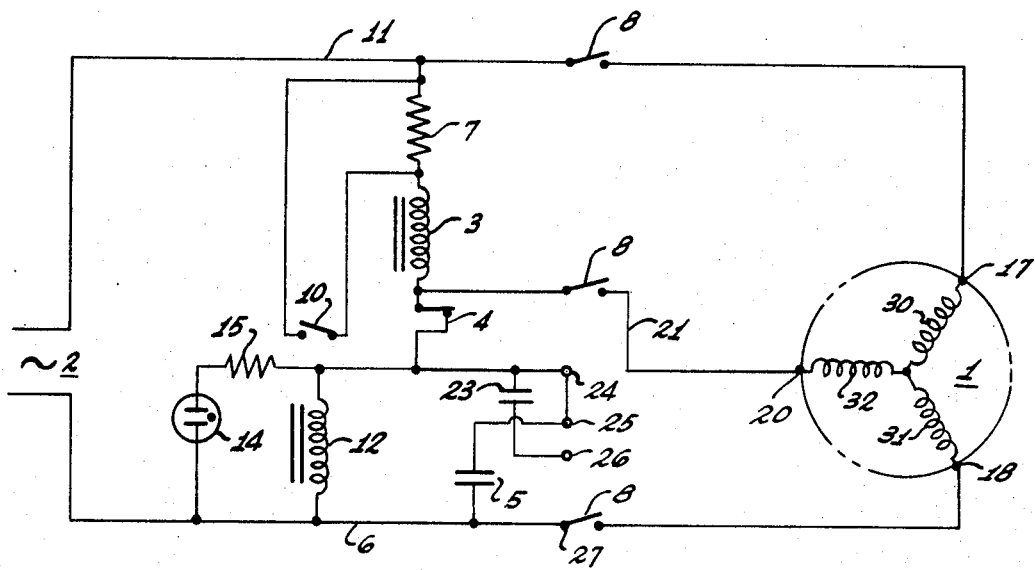

United States Patent
Johnstone

[15] 3,673,480
[45] June 27, 1972

[54] CIRCUIT FOR OPERATING POLYPHASE INDUCTION MOTORS FROM SINGLE PHASE SUPPLY

[72] Inventor: Colin G. Johnstone, 38732 Puerta St., Palmdale, Calif. 93550

[22] Filed: Oct. 26, 1970

[21] Appl. No.: 83,847

[52] U.S. Cl..........................318/221 G, 318/218, 318/220 R
[51] Int. Cl. ............................................................H02p 1/44
[58] Field of Search................318/218, 220 R, 221 R, 221 F, 318/221 G

[56] References Cited

UNITED STATES PATENTS 2,832,925   4/1958   Koll et al............................318/221 R
3,122,693   2/1964   Hermansdorfer..................318/221 R Primary Examiner—Gene Z. Rubinson
Attorney—Forrest J. Lilly

[57] ABSTRACT

A circuit for providing the phased currents necessary for starting and operating polyphase motors from a single phase voltage supply. Out of phase currents are obtained by connecting a capacitor to one or more of the motor windings. Upon the motors' reaching nearly full speed, a potential voltage relay operates to remove the capacitor from the motor circuit. Chatter of the potential voltage relay is avoided by inclusion in the circuit of a series resistor which is selectively shorted by a further relay connected in parallel with the starting capacitor.

16 Claims, 2 Drawing Figures

INVENTOR.
COLIN G. JOHNSTONE
BY Forrest J. Lilly
ATTORNEY 3,673,480

CIRCUIT FOR OPERATING POLYPHASE INDUCTION MOTORS FROM SINGLE PHASE SUPPLY

This invention relates to circuitry for starting and operating three phase electric motors from single phase power supplies. More specifically, this invention involves circuitry which produces the phased currents necessary to start three phase induction motors and which will avoid chatter of the relays used in the circuit.

Induction motors are the most common of the many varieties of electric motors. In this type of motor, alternating current is supplied directly to the stator and supplied to the rotor by induction. Since there is no direct connection of electric power to the rotor, starting and running torque is produced by transformer action of the stator field or fields.

As is well known, polyphase induction motors produce a field in the motor air gap which rotates at a speed dependent upon the frequency of the applied voltage. Starting of a polyphase motor, then, requires no auxiliary circuitry. The rotating stator field creates a starting torque on the rotor which causes the rotor to accelerate to its operating speed.

Single phase induction motors, however, do not inherently produce a starting torque, though they will continue to run if started by auxiliary means. The reason is that single phase voltages do not create the rotating fields necessary to produce a starting torque. Auxiliary means are used to generate out of phase currents through the single phase stator. In this way, a rotating field is produced as in a polyphase motor.

Similarly, it is known that a polyphase motor may be operated from a single phase course although, again, an auxiliary means of starting is required. In many instances, it is advantageous to operate a three phase motor from a single phase source. For example, many gyroscopes are powered by a three phase motor supplied from a single phase source because of improved operating characteristics. Also, many times three phase power is not readily available to a user who has a three phase motor. Also, because of differences in the numbers constructed, three phase motors are quite often cheaper than similarly rated single phase motors. Finally, many machines, particularly those used in the machine tool industry, are equipped with built-in three phase motors. Usually, it is impossible to change motors in such machines to single phase.

There are, accordingly, many instances when it has been found advantageous to utilize three phase motors in applications where only single phase power is available. Three phase motors used in such applications, however, must be started by auxiliary means. The present invention serves this function.

Generally, it is desirable to switch auxiliary starting circuits into the motor circuit only during the time needed to start the motor. It has been found that the most reliable means of switching in such cases is a voltage or current relay. Unfortunately, however, it has been found in practice that such relays chatter under certain circuit conditions. Generally, chattering is caused by transient conditions inherent in any power source. It is a major object of this invention, therefore, to provide means of stopping such relay chatter.

It is another object of this invention to provide a circuit which will generate the phased currents necessary to start a three phase motor from a single phase supply.

It is a further object of this invention to provide a circuit which will generate the required currents to allow reversal and speed changes of three phase motors operated from single phase supplies.

Figure 2:
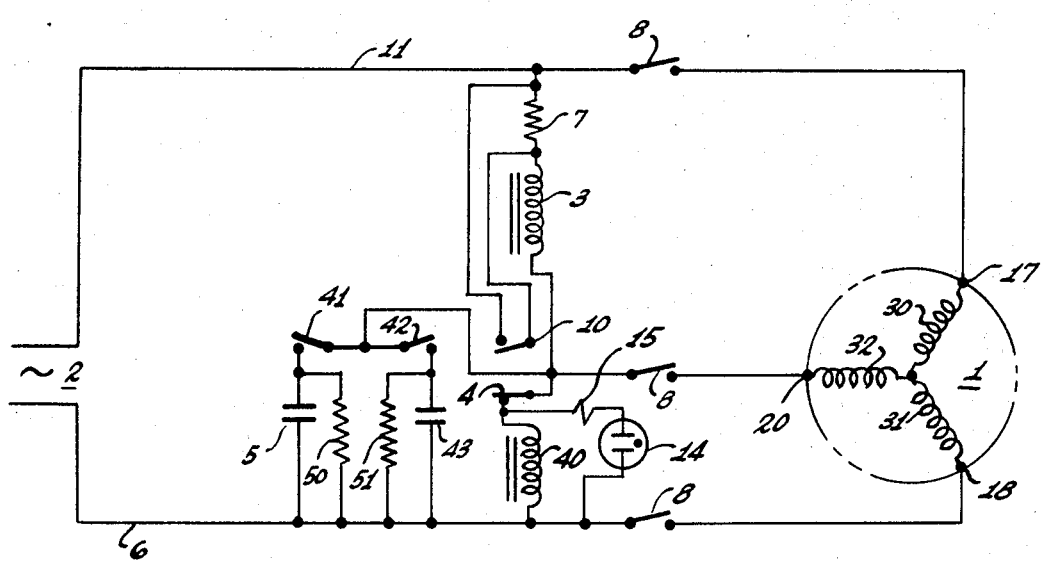

These and other objects of this invention will become readily apparent from reference to the following specification and the attached drawing, wherein:

FIG. 1 is a schematic diagram of the preferred embodiment of this invention; and FIG. 2 is a schematic diagram of a variation of the preferred embodiment.

Referring to FIG. 1, a three phase motor 1 is shown connected to a source of single phase power 2. Motor 1 is shown in the drawing as wye-wound. In this configuration, the motor will operate with an output of approximately two-thirds rated horsepower when supplied from a single phase source. Delta-wound motors can also be started and operated with this invention, but the power loss is greater. Accordingly, wye-wound motors are preferred, though not necessary.

Motor starting circuitry according to this invention includes a potential voltage relay 3. While many similar relays could be used, the preferred embodiment utilizes a MARS 64 relay manufactured by General Electric.

Relay 3 is serially connected via normally closed contacts 4 to capacitor 5. The opposite side of capacitor 5 is connected to one of the two power supply lines 6.

Resistor 7 is serially connected between opposite power supply line 11 and relay 3. Single phase line voltage, then, is applied constantly to the series resistor-inductor-capacitor circuit.

The coil of potential voltage relay 3 is formed of several thousand turns of very fine magnet wire. It presents, then, a very high impedance to the line voltage and draws very little current. In effect, it senses the voltage in the circuit without appreciably altering the current values. Such relays, and their operation, are well known and will not be further described herein.

Resistor 7 is paralleled by second relay contacts 10, which are normally open. When closed, however, they effectively remove resistor 7 from the circuit and connect the upper side of coil 3 directly to power line 11.

Contacts 10 are operated by a second relay 12, connected in parallel to capacitor 5. Its function, as will be explained below, is primarily to selectively insert and remove resistor 7 from the motor starting circuit.

Neon bulb 14 and resistor 15 are connected in series to each other and in parallel across relay 12. Capacitor 5, then, is one branch of a three branch parallel circuit with the other two branches formed by relay 12 and the bulb 14 and resistor 15 combination.

Two terminals 17, 18 of motor 1 are connected to power lines 6, 11 via three-pole switch 8. Third motor terminal 20 is connected via line 21 to the junction of relay 3 and relay contacts 4 when switch 8 is closed.

Capacitor 23 in FIG. 1 is shown removed from the circuit. By interconnecting terminals 24, 25, 26, 27 in various ways, as is readily apparent, the total capacitance can be varied. As connected in the drawing, only capacitor 5 is in the circuit. If terminal 26 were shorted to terminal 27, however, both capacitors would be connected in parallel and the total capacitance increased. Less capacitance can be obtained by connection of the two capacitors in series. It has been found that a single capacitor is sufficient for average motors rated in a medium range of 1 to 3 horsepower. For average motors rated from three to 6 horsepower, however, the parallel capacitor connection should be used. For low horsepower motors, that is, motors below about 1 horsepower, it has been found generally advisable to connect the two capacitors in series.

Operation of the circuit of FIG. 1 is as follows. The starting circuit is constantly connected across the single phase supply lines 6, 11. Since the impedance of resistor 7 and the coil of relay 3 is very high (about 25,000 ohms in the preferred embodiment), little current is drawn through the starting circuit. Since the impedance of capacitor 5 is much less than the impedance of resistor 7 and relay 3, very little voltage appears across the capacitor. Relay contacts 10, therefore, are open and contacts 4 are closed, the normal condition for each.

Closure of motor starting switch 8 places line voltage across coils 30, 31 of motor 1. As is well known, the initial impedance of an induction motor, that is, when the rotor is at rest, is quite low compared to its running impedance. Following closure of switch 8, then, an initially high current surges through coils 30 and 31. This current alone, however, creates no starting torque since the resulting fields are unidirectional.

A second current, however, passes through motor coil 32 and capacitor 5. Since the branch contains a capacitive reactance, the current, and resulting field, is out of phase with the current through coils 30 and 31. As is well known, the out-of-phase fields combine to produce a net rotating field and create the torque needed to start the rotor turning.

As the motor speed increases, the voltage across winding 32 and capacitor 5 increases. From an initially low value, the voltage across each element increases to a value considerably above line voltage. This occurs because motor winding 32, functioning as a starting winding, undergoes a changing inductance. As motor synchronous speed is approached, the series connected coil 32 and capacitor 5 tend to approach series resonance. Thus, while the individual voltages would vectorally add to a total slightly less than the applied voltage, the individual values become quite high.

Relay 12 is connected in parallel with capacitor 5. In the usual case of a single phase power supply of approximately 250 volts r.m.s., relay 12 is calibrated to pull in at about 20 volts, thereby closing contacts 10. Since capacitor 5 begins to charge almost immediately, the voltage across relay 12 rapidly exceeds 20 volts. Contacts 10 close, therefore, very soon after starting switch 8 is closed. For nearly the entire period of the acceleration of motor 1, resistor 7 is out of the circuit and potential relay 3 has applied to it the summed voltages across motor coils 30 and 32.

It was explained above that the voltage across coil 32 will increase rapidly as motor synchronous speed is approached. At the same time, voltage across coil 30 tends to remain constant. Relay 3, then, senses a voltage which is increasing with the speed of the motor.

Relay 2 is calibrated to pull in at approximately 275 volts r.m.s., or about 25 volts above line voltage in the case of a 250 volt power supply. When the increasing voltage reaches this value, the starting capacitor may be removed from the circuit and the motor will continue to run. At this point, relay 3 pulls in and opens contacts 4, breaking the connection between coil 32 and capacitor 5. The capacitor then begins to discharge through coil 12 and neon bulb 14.

As capacitor 5 discharges, the voltage will fall rapidly below the drop out value of relay 12. Using the component values set out below, the capacitor will discharge in about 100 miliseconds. Contacts 10 are then opened and resistor 7 is effectively replaced in the circuit. The voltage which then appears across the coil of potential relay 3 is greater than the coil's drop out voltage and contacts 4 will be held open until the voltage across coil 30 falls due to overloading, or as another motor is started from the circuit. Contacts 4 will then close and capacitor 5 will supply the necessary out-of-phase current to restore motor 1 to near synchronous speed or to supply the phased current needed to start another motor.

It should be noted that capacitor 5 is not left in the motor circuit after the motor has reached its operating speed. While oil filled capacitors may be obtained that can be left in a running motor circuit, they are generally expensive. Accordingly, it is desirable to utilize a paper insulated capacitor which is then switched out of the circuit.

If such a capacitor were left in the motor circuit for an excessive time, however, it would burn out. Bulb 14 provides a visual indication of the presence of a charge on capacitor 5 to guard against the capacitor being left in the circuit.

As soon as the ignition voltage on the first cycle after closure of switch 8 is reached, bulb 14 begins to conduct current and glow. It will continue to glow so long as capacitor 5 retains a charge above its cut-off level. After contacts 4 remove capacitor 5 from the motor circuit, it discharges through relay 12 and bulb 14 and circuit limiting resistor 15. The charge remaining on the capacitor after the extinguishing voltage of bulb 14 is passed is completely discharged through coil 12. When bulb 14 turns off, the operator may feel assured that the capacitor was properly removed from the circuit. Bulb 14 serves, therefore, as a visual safety check. Should bulb 14 continue to glow for more than a few seconds after the motor reaches its operating speed, an operator would thereby be informed of a circuit malfunction.

As explained above, line voltage is constantly applied to the starting circuit. Virtually the entire voltage appears across resistor 7 and relay 3 because of the respective impedance values of those components and capacitor 5. Because of transient surges on the power lines connected to the starting circuit, it has been found that relay 3 can be made to chatter. Since the terminal voltage of the usual industrial power supply is near the pull in value of the relay, the contacts may begin, under these transient conditions, to mechanically resonate. After switch 8 is closed, however, and the total voltage across coils 30, 32 drops prior to the motor's attaining synchronous speed, the relay voltage is low enough that the relay will not chatter. In addition, similar transient conditions encountered when motor 1 is switched to a higher speed or to a reverse direction can cause chattering.

Resistor 7 is left in the circuit for a duration of time necessary for the voltage across coils 30 and 32 to fall. Thereafter, it is removed by relay 12 so that the entire voltage across motor coils 30, 32 appears across the coil of relay 3. The sole purpose, then, of resistor 7 and relay 12 is to ensure that relay 3 does not chatter. It operates to reduce the voltage appearing across the relay at all times except during the period when a motor is starting.

As will be readily appreciated, the circuit aids operation of motor 1 at other times than starting. For example, another three phase motor can be started and operated by connecting it to terminals 17, 18 and 20 of motor 1. This would cause the voltage across coils 30 and 32 to drop sufficiently for coil 3 to drop out and reconnect capacitor 5 to the circuit. Thereafter, the sequence would occur as above described. Similarly, the circuit would operate upon reversal of motor 1 or an increase in speed of motor 1.

Impedance values of the various circuit components of FIG. 1 are as follows:

| Element | Value |
| --- | --- |
| 3 | 10,000 ohms |
| 5 & 23 | 270–324 mfd. (110/120V.) |
| 7 | 15,000 ohms |
| 12 | 120 ohms |
| 15 | 100–200 Kilohms |

In many applications involving high-horsepower motors, it is necessary to switch higher values of current than the circuit of FIG. 1 will accomplish. In those cases, the embodiment of this invention illustrated in FIG. 2 is utilized. Components in that Figure which accomplish identical roles to those of FIG. 1 have been identically numbered.

Because of the high impedance in the series starting circuit, relay 40 will maintain its contacts 41, 42 normally open. Closure of starting switch 8, however, places a higher voltage across relay 40, causing it to pull in, connecting capacitors 5, 43 in series with motor coil 32. At the same time, relay 40 closes contacts 10, removing resistor 7 from the circuit. Thereafter, the circuit operates as described above in connection with FIG. 1.

While two starting capacitors are shown in FIG. 2, any number may be utilized. As the horsepower of the motors to be started increases, more capacitors would be added. Also, as higher values of current are reached, greater numbers of relay contacts would be added.

Charges of capacitors 5, 43 are removed through resistors 50, 51. These resistors may have a resistance value of about 15,000 ohms.

In the second embodiment, neon bulb 14 and current limiting resistor 15 are placed across relay 40. Bulb 14 will be turned off, then, by the opening of relay contacts 4. This indicates proper operation of the circuit.

I claim:

1. In a circuit for operating a polyphase induction motor from a single phase voltage supply, the combination comprising, a series connection of a first relay coil means, a first contact means controlled thereby and an induction motor starting capacitor, means connected in parallel with said induction motor starting capacitor for reducing a charge stored thereon, means for applying a single phase voltage across said series connection, and, means for supplying inputs to a polyphase induction motor, consisting of first and second input means connected to said single phase applying means and third input means connected between said first relay coil means and said first contact means.

2. The circuit of claim 1, wherein said series connection further comprises a variable impedance means.

3. The circuit of claim 1, wherein,
said first contact means are normally closed, thereby completing said series circuit.

4. The circuit of claim 2, wherein,
said charge reducing means is connected to vary said variable impedance in response to the value of voltage on said induction motor starting capacitor.

5. The circuit of claim 1, further comprising
means for visually indicating the presence of a charge on said induction motor starting capacitor.

6. The circuit of claim 5, wherein
said indicating means comprises a neon bulb connected in parallel with said induction motor starting capacitor.

7. The circuit of claim 2, wherein
said variable impedance means comprises a resistor with a second relay contact means connected in parallel therewith, and
said charge reducing means comprises a second relay coil means for controlling said second relay contact means.

8. The circuit of claim 7, wherein
said second relay contact means is normally open.

9. The circuit of claim 1, wherein
said induction motor starting capacitor comprises a plurality of capacitors so arranged that they may be connected in series, parallel or singly in said series circuit.

10. In a circuit for operating a polyphase induction motor from a single phase voltage supply,
first and second relay coil means connected in series by a first relay contact means operated by said first coil means,
variable impedance means connected in series with said first relay coil means,
capacitor means connected in parallel across said second relay coil means by second relay contact means operated by said second coil means, and
means for applying a single phase voltage across said series connection.

11. The circuit of claim 10, further comprising
means for supplying inputs to a three phase motor, consisting of
first and second input means connected to said single phase applying means, and
third input means connected between said first coil means and said first contact means.

12. The circuit of claim 10, further comprising
means connected in parallel with said capacitor means for reducing a charge stored thereon.

13. The circuit of claim 12, wherein
said charge reducing means comprises a resistor means.

14. The circuit of claim 13, wherein
said variable impedance means comprises a resistor with a third relay contact means connected in parallel therewith and controlled by said second coil means.

15. The circuit of claim 14, wherein
said first contact means is normally closed and said second and third contact means are normally open.

16. The circuit of claim 10, further comprising
means for supplying inputs to a three phase motor, consisting of
first and second input means connected to said single phase applying means, and
third input means connected between said first coil means and said first contact means,
and wherein said variable impedance means comprises a resistor with a third relay contact means connected in parallel therewith and controlled by said second coil means.

* * * * *